Figure 1:
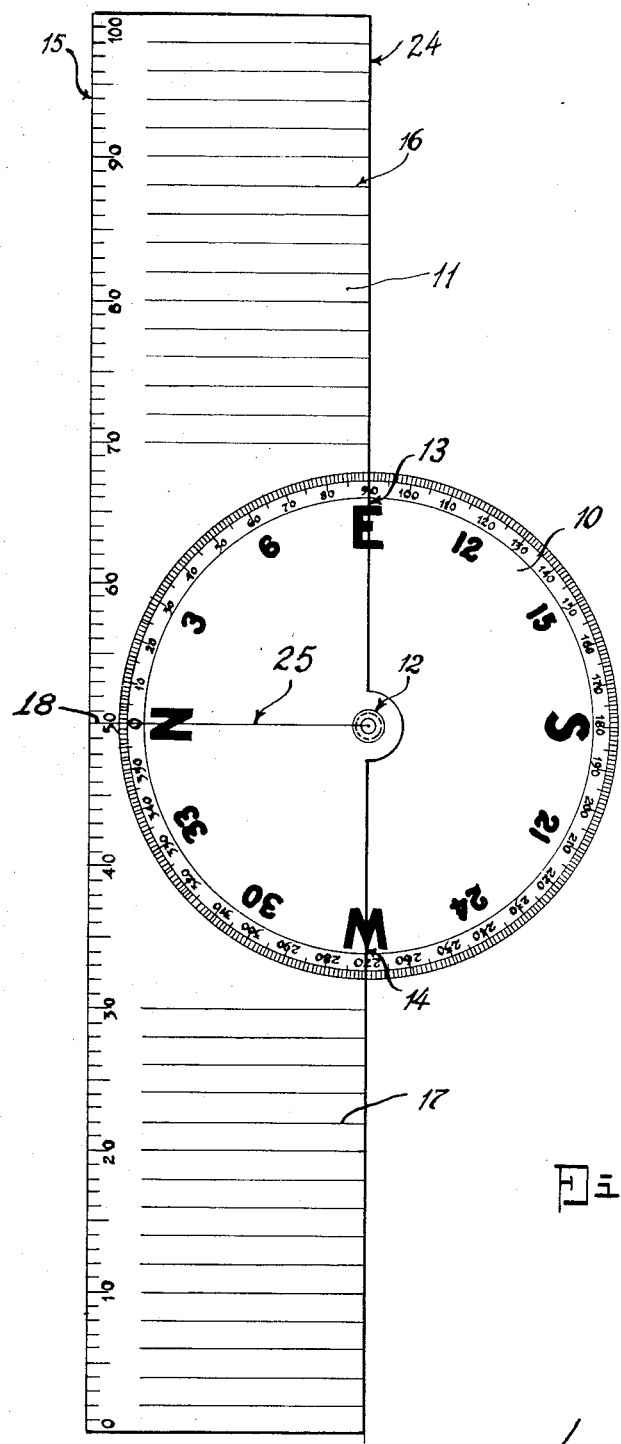

March 28, 1944.  L. A. WARNER  2,345,020
NAVIGATIONAL INSTRUMENT
Filed April 19, 1941   2 Sheets-Sheet 1

Louis A. Warner
INVENTOR.

BY Ben. J. Chromy
his atty.

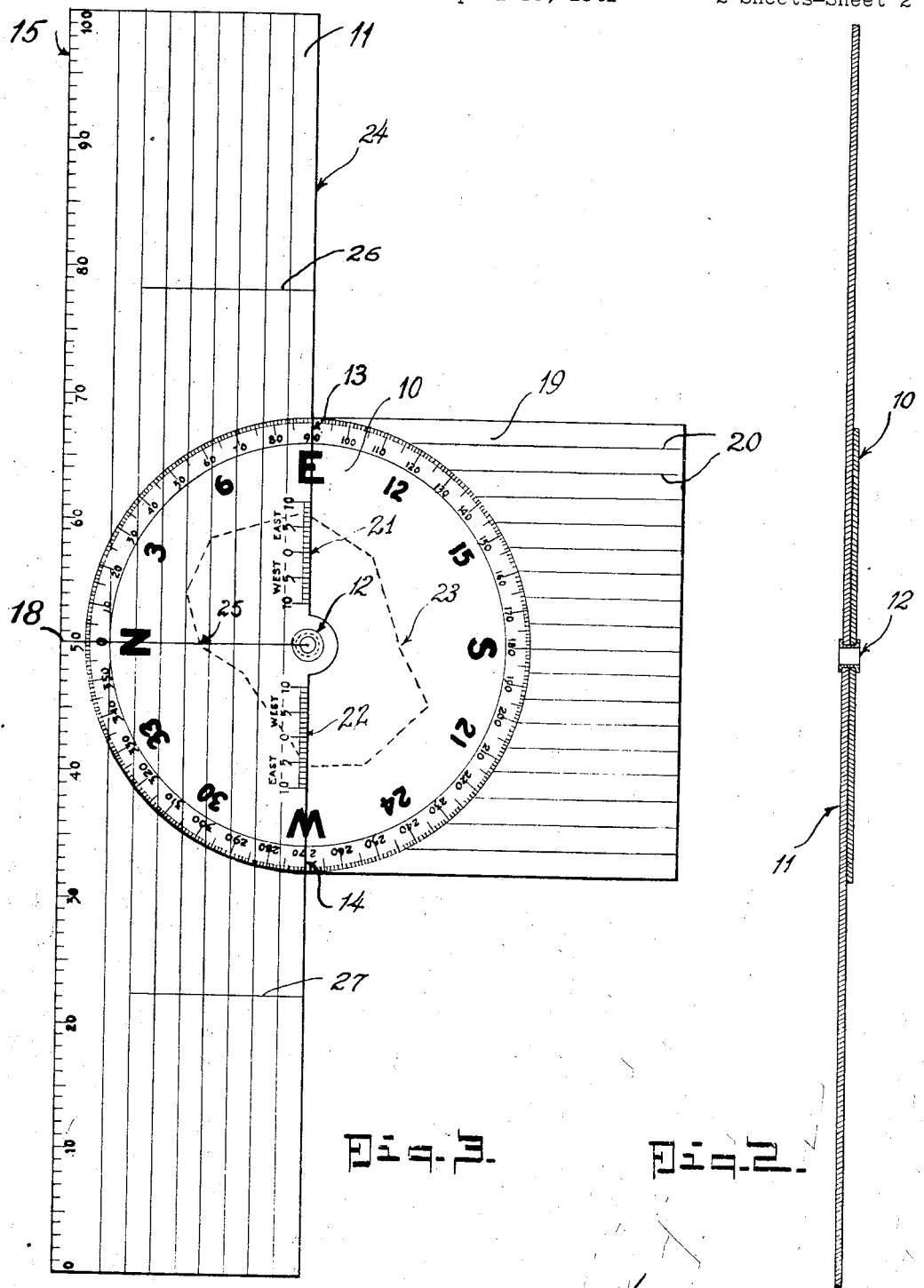

Patented Mar. 28, 1944

2,345,020

UNITED STATES PATENT OFFICE 2,345,020

NAVIGATIONAL INSTRUMENT

Louis Allen Warner, Baltimore, Md.

Application April 19, 1941, Serial No. 389,427

6 Claims. (Cl. 33—75)

This invention relates to a course and distance plotting device for use in navigation. More particularly this invention relates to a navigational plotter from which true courses and distances from one point to another may be derived when it is used in conjunction with a chart.

An object of this invention is to provide a device for correcting compass errors, and converting true courses to compass courses.

Another object of this invention is to provide a device for orienting a navigational protractor to true magnetic or compass meridians.

Still another object of this invention is to provide for plotting magnetic or true bearings.

A further object of this invention is to provide a device for use in conjunction with the plotting instrument to construct a deviation graph wherefrom the deviation of a particular compass may be read directly on any course, without the necessity of interpolation.

Still another object of this invention is to provide a device for directly indicating the compass deviation for any course, or its reciprocal.

A further object of this invention is to provide a device on which the computations and conversions set forth in the preceding objects may be performed on the device directly in one continuous operation without the necessity of using supplementary devices or calculations.

Other objects of this invention will be apparent to those skilled in the art to which it relates, from the following specifications, the drawings and the claims.

In accordance with this invention I provide a convenient instrument which may be employed while piloting or operating a craft, such as an aircraft, and with which distances and initial true courses and their reciprocals or back bearings, may be derived, and the corrections for the compass errors of variation and deviation applied. My device is a complete course plotting instrument whose indications are natural to use and direct-reading, and which may be obtained without the necessity of centering the protractor directly over a meridian, or of constructing a meridian by drawing a line parallel to the printed meridians on charts. It may, therefore, be used with as great facility for plotting courses or bearings running in a general north and south direction between the printed meridians, as for plotting courses and bearings cutting the meridians at an angle. Consequently, this device lends itself to convenient use for pilots in solving numerous navigational problems during actual flight operations.

In general, one embodiment of this device consists of a substantially circular protractor scale calibrated from zero to 360 degrees and resembling a compass rose. A rectangular member is pivoted at the center of the aforesaid protractor scale at a point central to one of its longitudinal edges. The other of the longitudinal edges is calibrated in some convenient scale for measuring distances and may also be used for drawing course lines between points on the chart. The rectangular member is also marked with a series of transverse lines. The purpose of the vertical grids thus formed to orient the protractors meridian to the true meridian on the chart will become apparent from further paragraphs of this specification.

Another embodiment of this invention in general consists of a member with a substantially circular protractor scale calibrated from zero to 360 degrees, and with a series of transverse lines directly below the protractor scale and parallel to its meridian line. The purpose of the vertical grid thus formed, is to orient the protractor to the true meridian on the chart.

Similarly, as with the embodiment outlined above, a rectangular member is pivoted at the center of the aforesaid protractor scale at a point central to one of its longitudinal edges. The pivoted longitudinal edge is calibrated with two deviation scales, one on each side of the pivot, for use in conjunction with the protractor scale to plot a deviation graph which may be used to indicate compass deviations for the particular craft in which the particular compass is installed, on various courses without interpolation, and their reciprocals or back bearings. The other of the longitudinal edges of the rectangular member is calibrated in some convenient scale for measuring distances and may also be used for drawing course lines between points on the chart.

These embodiments of this invention will be more fully described in the following paragraphs of this specification in conjunction with the drawings in which, briefly, Fig. 1 is a top plan view of one embodiment, Fig. 2 is a sectional view taken along the line 2—2 of Fig. 1. Fig. 3 is a top plan view of another embodiment.

Referring to the drawings in detail, reference numeral 10 designates a circular card-like member which may be of cardboard, transparent Celluloid, or the like. The circumference of this circular member 10 is calibrated in degrees from zero to 360. The zero and 360th calibration corresponds to north of the compass rose, 90 corresponds to east, 180 corresponds to south and likewise 270 corresponds to west. A line 25 connecting the 0 and 180 degree calibration will be referred to as the protractor's meridian. The rectangular member 11 is pivoted at the center of the circular member 10, by means of a rivet 12, so that edges 13 and 14 on the rectangular member 11, when moved across the various diameters of circular scale 10, indicate on its graduated circumference the various course readings and their diametrically opposite 180 degree reciprocal back bearings or readings. Longitudinal edge 15 of elongated member 11, is calibrated for scaling distances, and for air navigational work is preferably a scale with a ratio of 1:500,000 such as that used in the U. S. Coast and Geodetic Survey sectional charts. The width of the rectangular member is made greater than the radius of card 10 so that the unobstructed edge 15 may be used as a straight-edge for drawing course lines between various points on the chart. The transverse grid lines 16 and 17 are drawn parallel to line 18 which runs transversely across the center of elongated member 11, and are for the purpose of orienting scale 10 true north and south, as will be set forth in the following paragraphs.

To plot true courses, edge 15 is laid down between the points of departure and destination. If the printed meridian on the chart happens to run through the center of rivet 12, scale 10 may be oriented true north and south by rotating it until the 0–180 degree meridian line 25 on circular scale 10 coincides with the printed meridian line on the chart. Then with the navigator visualizing himself at the center of scale 10, the courses to and from his destination may be read directly from the circular scale 10 at edges 13 and 14 respectively of rectangular member 11.

If the center of scale 10 should lie between the printed meridians, several alternative methods may be used for orienting scale 10 in a true north and south direction. The first, is to slide edge 15 laterally along the course line until a meridian appears at the center of rivet 12. Then the procedure becomes exactly as outlined above. Circular scale 10 is then oriented so that its meridian line 25 coincides with the printed meridian line on the chart and the true courses read directly at edges 13 and 14.

Another method, utilizes the transverse lines 16, 17, and 18 on elongated member 11. Circular scale 10 is held against the chart, and elongated rectangular member 11 is rotated, until one of the printed meridians on the chart coincides with or lies parallel to any of its vertical grid lines 16 and 17; central transverse line 18 of elongated member 11 being parallel to the grid lines, is also then oriented in a true north and south direction. Now elongated member 11 is held against the chart and circular scale 10 rotated until its meridian line 25 coincides with line 18 on elongated member 11. This procedure orients circular scale 10 to the true meridian through that point, and when edge 15 of elongated member 11 is swung back to coincide with the course line, true courses may again be read at the edges 13 and 14.

The plotter may be used to derive magnetic courses directly, by orienting transverse line 18 on elongated member 11 to the true meridian, and setting the zero or north point on circular scale 10 to the number of degrees east or west of the transverse line 18 of elongated member 11 indicated as the variation by the agonic or isogonic lines on the chart. Then if the edge 15 of elongated member 11 is now aligned to the course line, edges 13 and 14 will indicate directly on circular scale 10 the magnetic courses, or the true courses corrected for the magnetic variation existing in the locality.

In the modified form of embodiment illustrated in Fig. 3, an alternative method may be used for orienting the scale 10 to the true meridian. Register member 19 is partially semi-circular and partially rectangular in form. The upper portion carries the circular scale 10, calibrated in the same manner as described above, for the embodiment of Fig. 1, while the lower portion has a series of transverse grid lines 20 parallel to the 0–180 degree meridian line of circular scale 10. In operation, edge 15 of elongated member 11 is laid along the course line, and elongated member 11 is held against the chart. Circular scale 10 is then oriented to the meridian by rotating register member 19 until one of the printed meridians on the chart coincides with or lies parallel to any of the vertical grid lines designated by numeral 20. True courses are then read directly at the edges 13 and 14 in conjunction with the calibrations on circular scale 10.

The plotter may be used to derive magnetic courses directly, by orienting line 18 to the true meridian and setting the 0 or north calibration on scale 10 the number of degrees east or west of line 18 indicated by the agonic or isogonic lines on the chart. When edge 15 is again aligned with the course line, edges 13 and 14 will indicate directly on scale 10 the magnetic courses, or the true courses corrected for the variation existing in the locality.

The deviation scales 21 and 22, in Fig. 3, are for use in conjunction with the polar graph type of deviation curve 23, to indicate the compass deviation on various courses, of the magnetic characteristic of the particular ship, for a particular compass for which the curve has been constructed, and provides the navigator with a convenient means for determining the deviation error without the necessity of referring to the compass correction card, and frequently interpolating its readings. The joint use of the scales 21 and 22 and the curve 23 gives the navigator the same information with reference to the compass deviations of the ship as do the agonic and isogonic lines printed on the charts with reference to the variation, that is, the angular value of the error in degrees, and the direction in which it is occurring, whether east or west.

Equipped with direct indications of both the variation of the magnetic meridian and deviation of the compass on the particular ship, the navigator may now use the plotter of Fig. 3 to calculate his compass course, corrected for both these errors. Transverse line 18 on elongated rectangular member 11 is first established parallel to the true meridian. The 0–180 degree meridian line 25 of circular scale 10 is then displaced a number of degrees east or west of line 18 equal to the variation, or displacement of the magnetic meridian from the true meridian, prevailing in the locality as indicated by the isogonic lines on the chart. In a most natural way the N calibration of circular scale 10 is displaced counterclockwise for westerly variation and clockwise for an easterly variation and the calibrations on circular scale 10 are used with reference to line 18 to determine the angular value of the displacement. If now circular scale 10 is now held fixed against the chart, and the edge 15 of elongated member 11 is now rotated back to the course line, the magnetic courses between the points plotted will be indicated at edges 13 and 14.

With the plotter in this position, the deviation of the ship for the magnetic course shown at edge 13 will be indicated at the point the curve 23 crosses the deviation scale 21 and the deviation for the magnetic course shown at edge 14 will be indicated at the point the curve 23 crosses the deviation scale 22. It would be well to point out that the deviations for these reciprocal course readings 180° apart are often dissimilar. The correction for the deviation is similar to that for variation, with the exception that transverse line 18 of elongated member 11 is now oriented to the magnetic meridian by placing it in coincidence with the 0–180 degree meridian line 25 of circular scale 10, which was previously established along the magnetic meridian when the correction for the variation was applied. Circular scale 10 may now be displaced with respect to line 18 of elongated member 11, in a direction and amount as indicated by the deviation angle registered at scales 21 or 22, so that if edge 15 is now rotated back to the course, the edges 13 and 14 will indicate the desired compass courses, corrected for both variation and deviation.

Similar procedure may be used, if desired, for setting the wind correction angle into the plotter after line 18 on elongated member 11 has been placed in coincidence with the compass meridian, so that compass headings or courses corrected for variation, deviation and wind, may be directly indicated at the edges 13 and 14.

It is of course understood that edge 24 of elongated member 11 may be used in the same manner as edge 15 for establishing the course line, and may even be preferred under certain conditions. In either case the indications at either 13 and 14 will be the same, since edges 15 and 24 are constructed parallel to each other. Transverse lines 26 and 27 of elongated member 11 which are parallel to the central transverse line 18 thereof, facilitate the orientation of elongated member 11 to have its transverse line 18 parallel to the true meridian.

The plotter may be used to great advantage for plotting magnetic or true bearings on charts, and with the incorporation of a deviation graph 23 with its structure, as shown in Fig. 3, may also be used to convert compass bearings into magnetic or true bearings.

It will be observed from the foregoing specification that while I have described preferred embodiments of my invention, in detail, I do not desire to limit this invention to those exact details except insofar as they may be defined by the appended claims.

What I claim and desire to secure by Letters Patent is as follows:

1. A navigator's plotting instrument for measuring distances and directions, comprising an elongated substantially rectangular transparent member having a length equal to several times its width and having a plurality of transverse mutually parallel lines inscribed thereon adapted to be used for transversely aligning said elongated member with the meridians or parallels on a chart, a graduated substantially circular transparent compass card having a radius smaller than the width of said substantially rectangular elongated member and having a radial meridian line, and a central pivot for said substantially circular compass card mounted for pivoting said substantially circular compass card to one of the elongated edges of said elongated member, one of the said transverse lines of said elongated member extending substantially from said pivot substantially across the narrow dimension of said elongated member, said elongated member being provided on the elongated edge thereof on which said compass card is pivoted with a deviation scale for deriving the deviation error for a particular compass system, and said compass card being provided with a deviation characteristic graph plotted in polar coordinates about the center of said circular compass card as a pole and said graph being positioned to register and read against said deviation scale.

2. In a navigational instrument, an elongated rectangular straight-edge member formed of transparent material and having two parallel long straight edges, pivot means positioned on one of said long straight edges approximately centrally thereof so that relatively large fractions of the length of said long straight edge project on both sides of said pivot means, said rectangular elongated member being provided with a transverse reading line passing through said pivot means and being perpendicular to said long straight edges, and being further provided with a plurality of auxiliary transverse aligning lines parallel to said transverse reading line, and a transparent register member comprising a circular graduated protractor compass rose and a protractor meridian passing through the north point of said compass rose, and being pivotally mounted at the center of its said protractor compass rose on said pivot means, said protractor compass rose being provided with a deviation graph plotted in polar coordinates about the center of said compass rose as a pole, and showing the magnetic deviation of the steering compass on the ship on which the instrument is to be used, and the straight edge of said elongated member which passes through said pivot means being provided adjacent to and on both sides of said pivot means with deviation scales showing the scale of said deviation graph and readable thereagainst.

3. In a navigational instrument, an elongated rectangular straight-edge member formed of transparent material and having two parallel long straight edges, pivot means positioned on one of said long straight edges of said elongated member, said rectangular elongated member being provided with a transverse reading line passing through said pivot means and being perpendicular to said long straight edges, and a transparent register member comprising a circular graduated protractor compass rose portion and a protractor meridian passing through the north point of said compass rose, said register member further comprising a skirt portion formed extending from said protractor portion in the direction of said protractor meridian, said skirt portion being provided with a series of spaced mutually parallel lines outside of said protractor portion, which are parallel to said protractor meridian, said register member being pivotally mounted at the center of its protractor portion on said pivot means.

4. A navigational instrument as set forth in claim 3, said compass rose portion of said register member being provided with a deviation graph plotted in polar coordinates about the center of said compass rose as a pole, and showing the magnetic deviation of the steering compass on the ship on which the instrument is to be used, and the straight edge of said elongated member which passes through said pivot means being provided adjacent to and on both sides of said pivot means with deviation scales showing the scale of said deviation graph and readable thereagainst.

5. A navigational instrument as set forth in claim 3, the radius of said protractor portion of said register member being less than the transverse width of said rectangular member, whereby the non pivot carrying edge of said rectangular member is unobstructed at all times for course reading.

6. A navigational instrument as set forth in claim 3, the boundaries of said skirt portion including two parallel lines which are tangents to the circumference of said protractor portion at the ends of a diameter of said protractor portion which is perpendicular to the meridian of said protractor portion.

LOUIS ALLEN WARNER.